Patented Feb. 15, 1927.

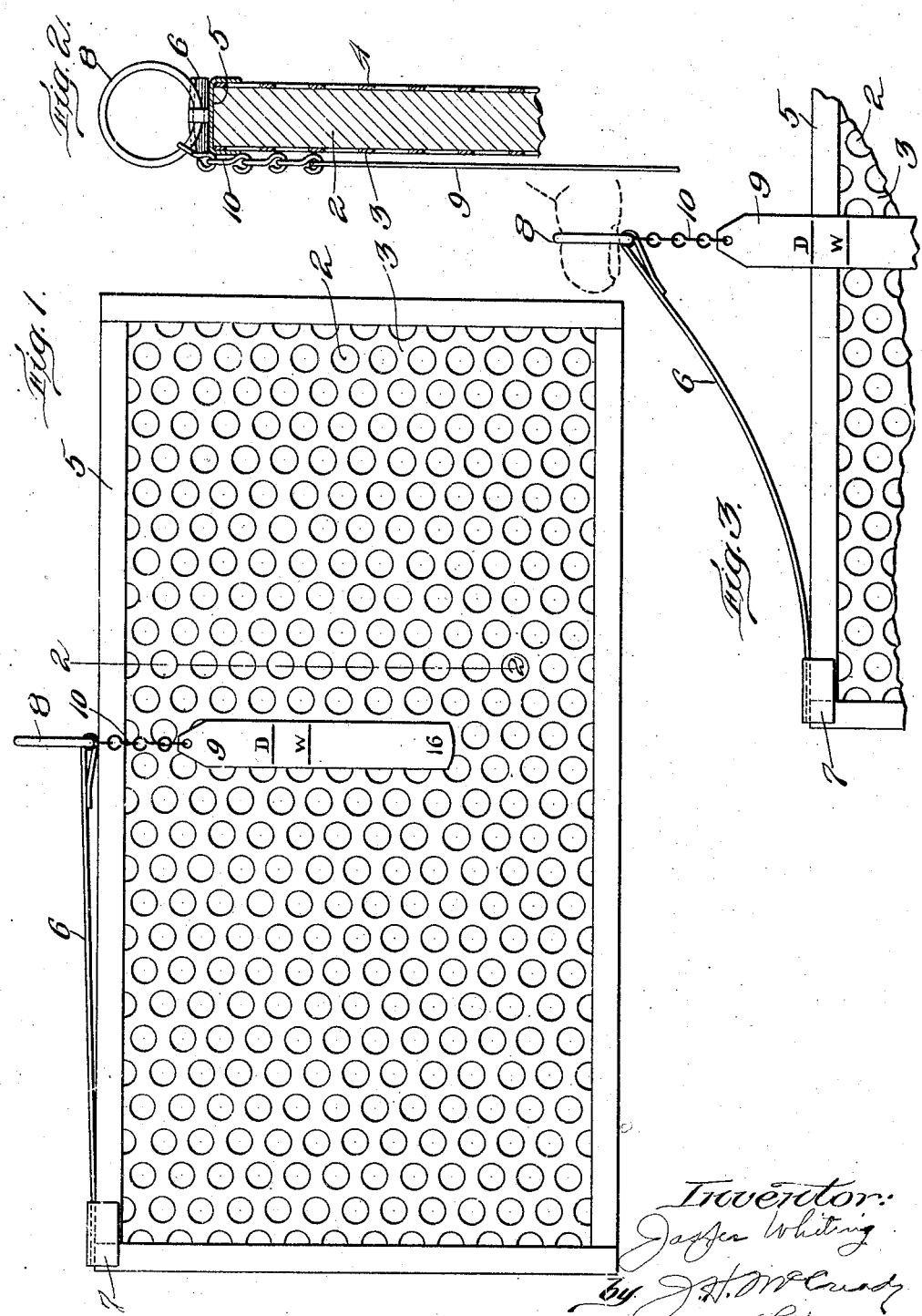

1,617,885

UNITED STATES PATENT OFFICE.

JASPER WHITING, OF BOSTON, MASSACHUSETTS.

ATTACHMENT FOR HUMIDITY-CONTROLLING UNITS.

Application filed August 10, 1922. Serial No. 580,901.

This invention relates to devices for modifying or controlling the humidity of the atmosphere within a container or enclosure. In my prior application, Serial No. 355,427, I have disclosed an apparatus for controlling the degree of humidity within containers which consists essentially in the use in a container of a tablet or slab preferably composed of heat resisting material impregnated with a hygroscopic salt, the function of this tablet being to absorb moisture from the air within the container. In another pending application, Serial No. 470,305, I have disclosed a method of maintaining a substantially predetermined degree of humidity within a container which, in principle, depends upon the use within the container of a similar tablet or body impregnated with salts in two phases so related that said tablet takes up moisture from the air within the container when the degree of humidity exceeds a predetermined point and gives up moisture to the air in the container when the degree of moisture drops below said point. In either case it is necessary to the satisfactory operation of the apparatus that the moisture content of the tablet or slab shall not exceed a certain amount, and in the case of the apparatus disclosed in the second application above mentioned, it is also essential that the moisture content of said tablet or slab shall not be less than a certain amount.

It is impossible from the mere appearance of the tablet or slab to tell whether or not it contains the requisite degree of moisture to function properly; and it is the chief object of the present invention to devise a ready and convenient means whereby the degree of moisture present in such a tablet or body can be ascertained at a glance, so that the user of the device can tell whether or not it is in effective condition. If the tablet has absorbed too much moisture it is necessary to bake it, or otherwise drive out the excess moisture. On the other hand, if it is too dry steps must be taken to supply additional moisture to it.

As has been stated above, the tablet, slab or other body performs its function by taking up moisture from the surrounding atmosphere, or imparting moisture to it, as the case may be, and consequently, as it acts, its own moisture content is affected. The degree of moisture present at any time in such a tablet or body can, therefore, be determined by weighing it and comparing it with its dry weight. The present invention proposes to utilize this principle in providing a ready and convenient attachment whereby the condition of the body as to moisture may be determined at a glance.

Referring now to the accompanying drawings,

Figure 1 is a side elevation of a moisture regulating unit or tablet equipped with an attachment embodying the present invention;

Fig. 2 is a cross sectional view on the line 2—2, Fig. 1; and

Fig. 3 is a front elevation of a portion of the device shown in Fig. 1, but illustrating the manner in which the moisture content in the tablet is indicated.

The construction shown comprises a device adapted to modify the humidity of the atmosphere immediately surrounding it, this device consisting of a rectangular tablet or body 2 preferably of asbestos or other heat resisting material impregnated with one or more salts, the nature of which will depend on the action which the device is designed to produce. This impregnation may be made in accordance with the disclosure in either of my prior applications above designated. The body 2 is supported between two perforated metal plates 3 and 4 which are held against opposite faces of the body by a metallic rim 5 that extends around the entire edge of the part 2, this rim also serving the purpose of reinforcing and supporting the edge of the body. While the drawings show a moisture controlling device of rectangular form, it obviously may be of any other convenient shape, the shape and dimensions being determined chiefly by the nature of the container in which it is to be used.

Secured to the upper edge of the device is a flat spring 6, the end of this spring being soldered under a U-shaped clip or strap 7 which embraces the rim 5 and is also soldered to said rim. The opposite end of the spring is free and has a ring 8 secured thereto which serves as a handle by means of which the entire device may conveniently be lifted. A thin flat scale 9 is secured to the ring 8 by a short length of chain 10, this scale being suitably calibrated.

When the device is lifted by the ring or handle 8, as shown in Fig. 3, the spring 6 will be deflected to a degree proportional to the mass or weight of the device, and this, obviously, will vary with the amount of water contained in the body 2. The scale 9 is calibrated to indicate variations in the degree of deflection of the spring 6, and consequently it indicates variations in the weight of the device, or in other words, it gives comparative indications of the weight of the device. When the device is suspended by the spring, as shown in Fig. 3, the scale 9 rests against one of the flat faces of the device and the calibration marks are designed to be observed with reference to the upper edge of the rim 5. The upper line marked D indicates approximately the dry weight of the device, or, more correctly, the weight at which the device contains the minimum degree of moisture suitable for effective operation. This may or may not be its "bone dry" weight, depending on the nature of the salts used in the body 2, and the use for which the device is intended. The lower mark W indicates the point at which the body contains a maximum practical weight of water.

Assuming, for instance, that the device has been made in accordance with the disclosure in my later application above designated, the upper edge of the rim 5 should cross the scale somewhere between the two calibration marks D and W when the device is in condition to function properly. If the edge of the rim comes above the line D it indicates that the unit is too dry and that water should be supplied to it, while if it comes below the line W, it indicates that the unit is too wet and that a part of the water should be dried out.

It will be observed that the free end of the spring 6 overlies the center of gravity of the tablet or unit so that when the device is lifted by the ring 8, as above described, it does not tip to any substantial extent. Since both the spring 6 and the scale 9 are thin and flat they lie snugly against the flat faces of the device and do not increase materially the space occupied by it. If the tablet or unit were of circular outline a curved spring would be used so that it would normally lie snugly against the edge of the device, bearing the same relation to it that the spring 6 does to the rectangular device shown in the drawings.

It will now be appreciated that this invention provides a very simple and inexpensive means for indicating at a glance the relative amount of moisture contained in the moisture controlling device. The user of the device thus is enabled to ascertain very quickly and conveniently whether or not it is in an efficient condition.

While I have herein shown and described the best embodiment of the invention which I have so far devised, it will be appreciated that this embodiment may be modified in many particulars without departing from the spirit or scope of this invention.

For instance other forms of springs may be used and the term "flat spring" is intended to include equivalent forms of springs. It will also be understood that the device may be used to regulate the humidity in gases other than air, and that the term "atmosphere" is intended to include such other gases.

Having thus described my invention, what I desire to claim as new is:

1. The combination with a device adapted to change the humidity of the surrounding atmosphere and through such action to have its own moisture content affected, of a flat spring having one end secured to said device and its opposite end free, and a scale cooperating with said spring to indicate the degree of deflection of the spring produced when the device is supported thereby, whereby variations in the moisture content of said device may be detected.

2. The combination with a device adapted to change the humidity of the surrounding atmosphere and through such action to have its own moisture content affected, of a flat spring having one end secured to said device and its opposite end free, a ring secured to the free end of said spring and a scale suspended from said ring and calibrated to indicate the degree of deflection of the spring produced when the device is supported thereby, whereby variations in the moisture content of said device may be detected.

3. The combination with a body having a composition enabling it to change the humidity of the surrounding atmosphere and through such action to have its own moisture content changed, of a flat spring having one end thereof secured to the edge of said body and its opposite end free, said spring normally lying closely against the edge of the body, a ring secured to the free end of said spring, and a thin scale connected with the free end of said spring and calibrated to indicate the relative amount of moisture contained in said body.

JASPER WHITING.